United States Patent
Wang et al.

(10) Patent No.: US 11,677,723 B2
(45) Date of Patent: Jun. 13, 2023

(54) THIRD-PARTY GATEWAY FOR SECURITY AND PRIVACY

(71) Applicant: BEIJING BYTEDANCE NETWORK TECHNOLOGY CO., LTD., Beijing (CN)

(72) Inventors: Jialin Wang, Singapore (SG); Fangfei Chen, Los Angeles, CA (US); Kaitong Guo, Singapore (SG); Yi Cao, Los Angeles, CA (US); Pangyang Chu, Los Angeles, CA (US)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/681,398

(22) Filed: Feb. 25, 2022

(65) Prior Publication Data
US 2023/0081612 A1 Mar. 16, 2023

Related U.S. Application Data

(60) Provisional application No. 63/242,161, filed on Sep. 9, 2021.

(51) Int. Cl.
*H04L 9/40* (2022.01)
*H04L 67/563* (2022.01)

(52) U.S. Cl.
CPC ........ *H04L 63/0281* (2013.01); *H04L 67/563* (2022.05)

(58) Field of Classification Search
CPC .......................... H04L 63/0281; H04L 67/563
See application file for complete search history.

(56) References Cited

U.S. PATENT DOCUMENTS

| 7,373,500 B2 * | 5/2008 | Ramelson | H04L 69/22 |
| | | | 713/150 |
| 9,021,546 B1 * | 4/2015 | Banerjee | H04L 63/102 |
| | | | 718/1 |

(Continued)

FOREIGN PATENT DOCUMENTS

CN       112910705 A    6/2021

OTHER PUBLICATIONS

Ramirez N., Layer 4 and Layer 7 Proxy Mode, Nov. 13, 2020 (pp. 1-10).

(Continued)

*Primary Examiner* — Harris C Wang

(57) ABSTRACT

Systems and methods directed to a third-party gateway that controls egress traffic from Internet Data Centers (IDC) and/or Virtual Private Clouds (VPC) are described. When egress traffic reaches the third-party gateway, a forward proxy may obtain a service identified or otherwise associated with the source IP address and port. Once, the service is identified, the third-party gateway may obtain a configuration rule specified by a rule manager to determine if the service is allowed to access the destination host(s). If the destination host is approved for the service, the forward proxy may send the traffic to the internet. If the destination host is not approved for the service, the forward proxy may block or otherwise drop the respective communication. In some examples, one or more auditors or auditing agencies may access essential information from the third-party gateway to view egress traffic logs and verify egress traffic approved destinations.

20 Claims, 7 Drawing Sheets

(56) References Cited

U.S. PATENT DOCUMENTS

| | | | |
|---|---|---|---|
| 9,578,050 B1* | 2/2017 | Barabash | H04L 63/0236 |
| 2003/0023798 A1* | 1/2003 | Appleby | H04L 67/1008 |
| | | | 710/240 |
| 2019/0149518 A1* | 5/2019 | Sevinc | H04L 63/0263 |
| | | | 726/11 |
| 2020/0089518 A1* | 3/2020 | Beyer | G06F 9/5072 |
| 2020/0314015 A1 | 10/2020 | Mariappan et al. | |
| 2022/0038310 A1* | 2/2022 | Boutros | H04L 45/76 |
| 2022/0109620 A1* | 4/2022 | Sarcar | H04L 45/64 |

OTHER PUBLICATIONS

Baka P., Setup HAProxy 2 with KeepAliveD and Layer 7 Retries, Dec. 20, 2019 (pp. 1-14).

Search Report dated Mar. 9, 2023 in PCT/SG2022/050641 (pp. 1-4).

\* cited by examiner

THIRD-PARTY GATEWAY FOR SECURITY AND PRIVACY

CROSS-REFERENCE TO RELATED APPLICATIONS

This application claims priority to U.S. Provisional Application Ser. No. 63/242,161, filed Sep. 9, 2021, and titled "THIRD PARTY GATEWAY", the disclosure of which is incorporated herein by reference in its entirety.

BACKGROUND

Datacenters are widely used to enhance service quality by running services and caching contents in cloud environments. Many companies adopt datacenters to reduce cost and further improve service quality; however, using datacenters may bring risks in user privacy. For example, user information including, but not limited to, user internet protocol addresses, usernames, passwords, payment information, and other user sensitive data may be identified, tracked, and/or otherwise compromised. Accordingly, such potential security issues may jeopardize the adoption of datacenters in regions governed by national, jurisdictional, and/or geographic user and data privacy regulations, where user data and user privacy are of top concerns.

Oftentimes, even if a central datacenter, such as a technology partner appointed by a local jurisdictional entity, such as a government, is involved and provides a trusted infrastructure for a company to operate on or otherwise use, it is often difficult if not impossible for the technology partner to provide the needed secure infrastructure due to its wide distribution nature and use as well as the needed scalability for handling traffic loads of various sizes. In many instances, little control is applied to egress traffic from particular internet datacenters (IDC) or virtual private datacenters. For example, at layer three, network engineers generally allow and do not restrict all outgoing traffic to guarantee the designed infrastructure works correctly with production networks. At layer four, most of the destination ports utilized will be transmission control protocol (TCP) TCP/80 and TCP/443; thus, it is often required to open such ports to allow communication between the internet and/or virtual private datacenters and the application such that the application can work as intended. Because egress traffic is not controlled at the TCP layer or internet protocol (IP) layer in an efficient manner, the previously mentioned problems tend to exist and the security tends to be inadequate. Thus, a solution is lacking that integrates a scalable and trusted solution when working with trusted technology providers and further while adhering to user and data privacy laws and regulations.

BRIEF SUMMARY

In accordance with examples of the present disclosure, a generalized solution and framework are described that provide a scalable third-party gateway for security and privacy to address secure computing and traffic routing needs of many datacenters. Such framework allows datacenters to continue to provide enhanced service quality in regions where user data and user privacy are of top concerns. Further, a third-party gateway for security and privacy, as part of a larger datacenter infrastructure, allows the datacenter to control egress traffic control at the application layer to enforce and ensure that only necessary requests are sent out to the internet. Thus, a third-party gateway for security and privacy may be configured to better control egress traffic from an IDC or VPC. Moreover, the third-party gateway for security and privacy provides flexibility such that only a particular service can visit a particular host on the Internet. As an example, if the outgoing traffic is not properly defined or the destination service is not whitelisted, the traffic will be blocked, and the client may get an HTTP/403 error.

In accordance with examples of the present disclosure, internal services, such as services internal to the third-party gateway for security and privacy, an IDC, and/or a VPC, are defined using service discovery tools. That is, once traffic reaches the third-party gateway for security and privacy, the third-party gateway for security and privacy acquires information about the traffic and an associated service that sent the traffic or otherwise generates the traffic received at the third-party gateway. Thus, the third-party gateway for security and privacy can determine if a particular rule exists and/or if a rule is configured based on the service in order to determine if outgoing traffic should be permitted or not. Further, a destination host may be defined on the third-party gateway for security and privacy to verify that the traffic can be sent to the destined hostname. The hostname can be defined in several ways, including but not limited to a fully qualified domain name (FQDN), a wildcard domain name, or a group of FQDNs. In addition, rules are configured once information needed to define the internal services and related destination hosts are obtained. For example, the rules may be stored in a key-value store, where keys may refer to the internal services and the values may refer to the allowed destination hosts for the respective service. Once a rule is defined, the outgoing traffic can be forwarded from the third-party gateway for security and privacy to the internet (e.g., to the destination host).

In accordance with examples of the present disclosure, a third-party gateway for security and privacy is described. The third-party gateway for security and privacy may include: a layer four load balancer; a plurality of forward proxy servers; and a management backend configured to provide a configuration implementation to the plurality of forward proxy servers, the configuration implementation specifying one or more processing parameters for each of the forward proxy servers, wherein each forward proxy server of the plurality of forward proxy servers is configured to perform layer seven network traffic processing on network traffic received from the layer four load balancer in accordance with the one or more processing parameters, the network traffic being directed to a third-party host residing external to a virtual private datacenter in which the third-party gateway for security and privacy resides.

In accordance with examples of the present disclosure, a method of providing enhanced security at a virtual private datacenter using a third-party gateway for security and privacy is described. The method may include receiving network traffic at a layer four load balancer of the third-party gateway for security and privacy, wherein the network traffic is directed to a third-party host residing external to the virtual private datacenter in which the third-party gateway for security and privacy resides, and wherein the network traffic is received from a service within the virtual private datacenter; and routing, by the layer four load balancer, the received network traffic to a forward proxy server of a plurality of forward proxy servers; and performing, by the forward proxy server of a plurality of forward proxy servers, layer seven network traffic processing on the received network traffic in accordance with one or more processing parameters included in a configuration implementation.

In accordance with examples of the present disclosure, a computer-readable storage medium including instructions for providing enhanced security at a virtual private datacenter using a third-party gateway for security and privacy is described. The computer-readable storage medium, when executed by a processor, causes the processor to: receive network traffic at a layer four load balancer of a third-party gateway for security and privacy, wherein the network traffic is directed to a third-party host residing external to a virtual private datacenter in which the third-party gateway for security and privacy resides, and wherein the network traffic is received from a service within the virtual private datacenter; route, by the layer four load balancer, the received network traffic to a forward proxy server of a plurality of forward proxy servers; and perform, by the forward proxy server of a plurality of forward proxy servers, layer seven network traffic processing on the received network traffic in accordance with one or more processing parameters included in a configuration implementation.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
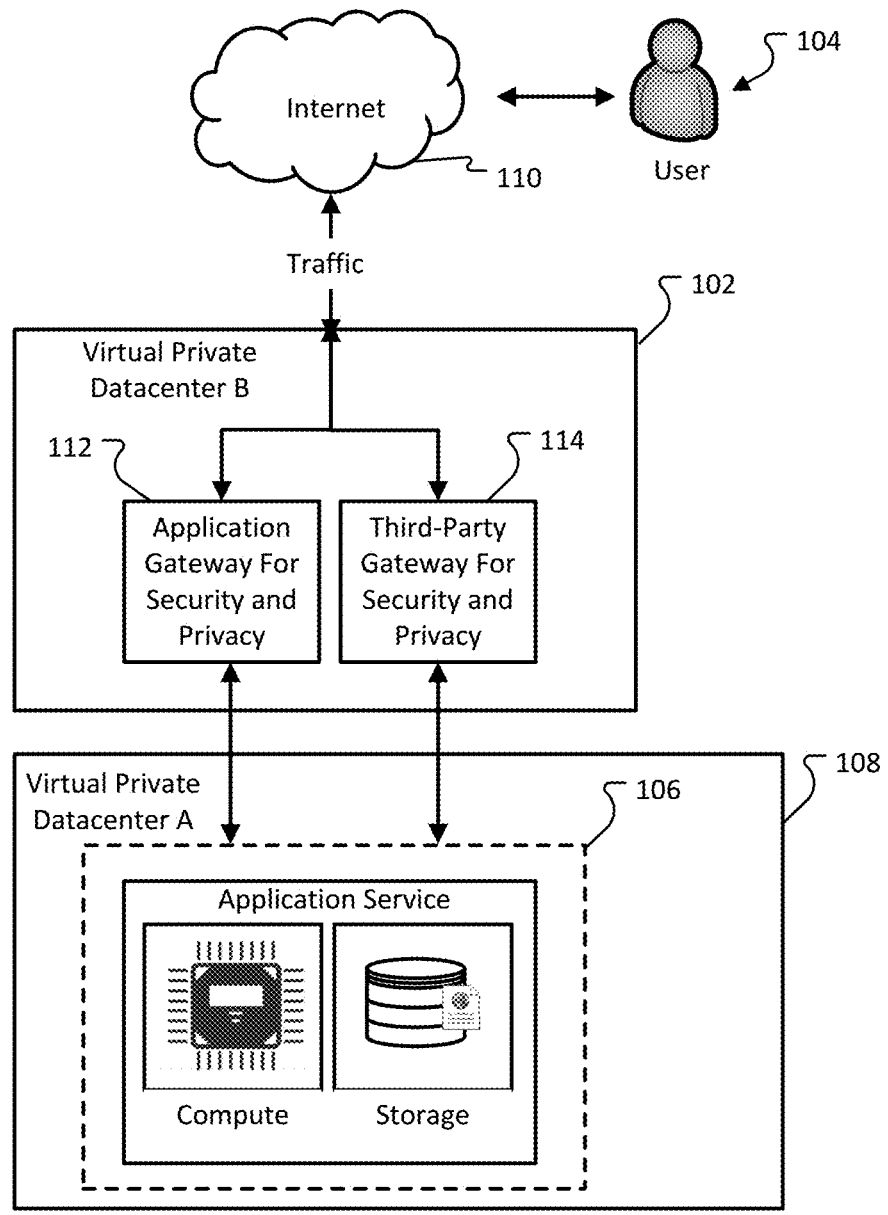
FIG. 1 depicts an example solution and framework that provides enhanced service quality in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a virtual private datacenter may include a third-party gateway for security and privacy to filter, screen, and/or modify one or more requests originating from within a virtual private datacenter as well as the associated response that is attempting to enter into the virtual private datacenter. Security and compliance features provided by the third-party gateway for security and privacy make allow an administrator, user, and/or auditor to more efficiently determine and manage the traffic leaving the virtual private datacenter in a detailed and specific manner. The third-party gateway for security and privacy therefore, provides the users confidence that the configurations work well and is auditable, such that egress traffic information, in addition to other information, can be provided to and relied upon by auditors to verify that unknown sensitive information is not leaving the virtual private datacenter or that the virtual private datacenter is not doing anything malicious or otherwise servicing malicious requests.

In examples, the third-party gateway for security and privacy allows an administrator to operate a cluster of forward proxies by interacting with a third-party gateway for security and privacy rule manager. The third-party gateway for security and privacy rule manager generally includes a frontend component and a backend management component. Thus, auditors may obtain information for the third-party gateway for security and privacy by calling or otherwise accessing a management API or using the third-party gateway for security and privacy rule manager to determine and/or identify the kinds of egress traffic that is allowed as well as the identification of what internal service is sending such information and to what external host. While serving traffic, the third-party gateway for security and privacy generally interacts with the trusted virtual private datacenter and may stream logging/auditing information to one or more auditors and/or a storage location accessible by one or more auditors.

In examples, the third-party gateway for security and privacy comprises a plurality of components that include, but are not limited to, a third-party gateway for security and privacy rule manager, a forward proxy, a web application firewall (WAF), one or more layer four load balancer(s), and one or more layer four load balancer controller. In the OSI Model, communications between computing systems are split into seven different abstraction layers: Physical (layer 1), Data Link (layer 2), Network (layer 3), Transport (layer 4), Session (layer 5), Presentation (layer 6), and Application (layer 7). The third-party gateway for security and privacy rule manager controls what rule is set or otherwise configured on the third-party gateway for security and privacy and provides an interface to allow administrators to read, modify, delete, and/or update one or more rules. Once there are changes on the rules, a configuration change may be triggered to update a configuration on the forward proxies and the WAF so that the newly configured rules will be applied automatically to traffic in a production environment setting.

In accordance with examples of the present disclosure, when the egress traffic reaches the third-party gateway for security and privacy, the one or more forward proxies obtain the service identified by the source IP address as well as the port. Once, the service is obtained, the third-party gateway for security and privacy identifies the rule and the configuration information of the rule which may be written by the third-party gateway for security and privacy rule manager to determine if the service is allowed to access the destination hosts. If the destination host is allowed for the service, the forward proxy will continue to send the traffic to the host via the internet. In some examples, where the destination host is not allowed for the service, the traffic will be blocked.

In accordance with examples of the present disclosure, the third-party gateway for security and privacy has visibility of outgoing requests and corresponding responses for audit logging purposes. That is, all outbound internet third-party requests may go through the third-party gateway for security and privacy. Thus, all requests that go through the third-party gateway for security and privacy can be logged for a given retention period. Additionally, a whitelist of internal microservices specifying which microservices may communicate with which domains, on which ports, and using which protocols may be established to ensure a chain of custody for outgoing third-party requests.

In accordance with examples of the present disclosure, and as an example scenario, whitelisted microservices in production may send wrapped HTTP requests to the third-party gateway for security and privacy using an API (client-side library to facilitate sending such wrapped request). For example: an HTTP request may appear as:

```
JSON
{
    method: "POST",
    url: "https://<domain name>/oauth2/v4/token",
    headers: [...],
    body: "..."
}
```

In examples, the HTTP request sent to the third-party may be associated with, but not limited to, a third-party authentication service (e.g., using a third-party to authenticate a user), a request for content (e.g., a request for advertisements), and/or payment services.

Upon receiving the wrapped request, the third-party gateway for security and privacy may initiate an HTTP/TLS connection to an external API endpoint (e.g. https://<domain name>/oauth2/v4/token), and send the actual request to the third-party.

Upon receiving the response, the third-party gateway for security and privacy sends the response to the originating microservices, for example:

```
JSON
{
    code: 200,
    headers: [...],
    body: "...",
}
```

FIG. 1 depicts an example solution and framework that provides enhanced service quality in accordance with examples of the present disclosure. The framework depicted in FIG. 1 utilizes a datacenter, such as the virtual private datacenter B 102 to perform an initial processing of requests received from a user, such as user 104. For example, a user 104 may initiate a request for one or more application services 106 residing at a virtual private datacenter A 108. Such request may be sent from the user 104, via the Internet 110, and received at the virtual private datacenter B 102. The virtual private datacenter B 102 may utilize an application gateway for security and privacy 112 to restrict, screen, and/or limit information flowing into and out of the virtual private datacenter A 108. In examples, the virtual datacenter A 108 may be a trusted technology provider and may be approved by one or more organizations, government entities, or the like. Alternatively, or in addition, the virtual private datacenter A 108 may be designated as complying with one or more data privacy and/or user privacy regulations or security levels as evidenced by a certification of such compliance. For example, the virtual private datacenter A 108 may be audited on a regular or otherwise periodic basis to achieve and/or maintain such designation. In examples, the virtual private datacenter A 108 may provide one or more application services 106 which may include, but is not limited to, compute and/or storage services. As further depicted in FIG. 1, a request initiated from the virtual private datacenter A 108 may be sent through the third-party gateway for security and privacy 114, where the third-party gateway for security and privacy 114 may restrict, screen, and/or limit information flowing out of and into the virtual private datacenter A 108. In examples, the virtual private datacenter A 108 may be owned and/or operated by an entity or organization that is different from the virtual private datacenter B 102.

Figure 2:
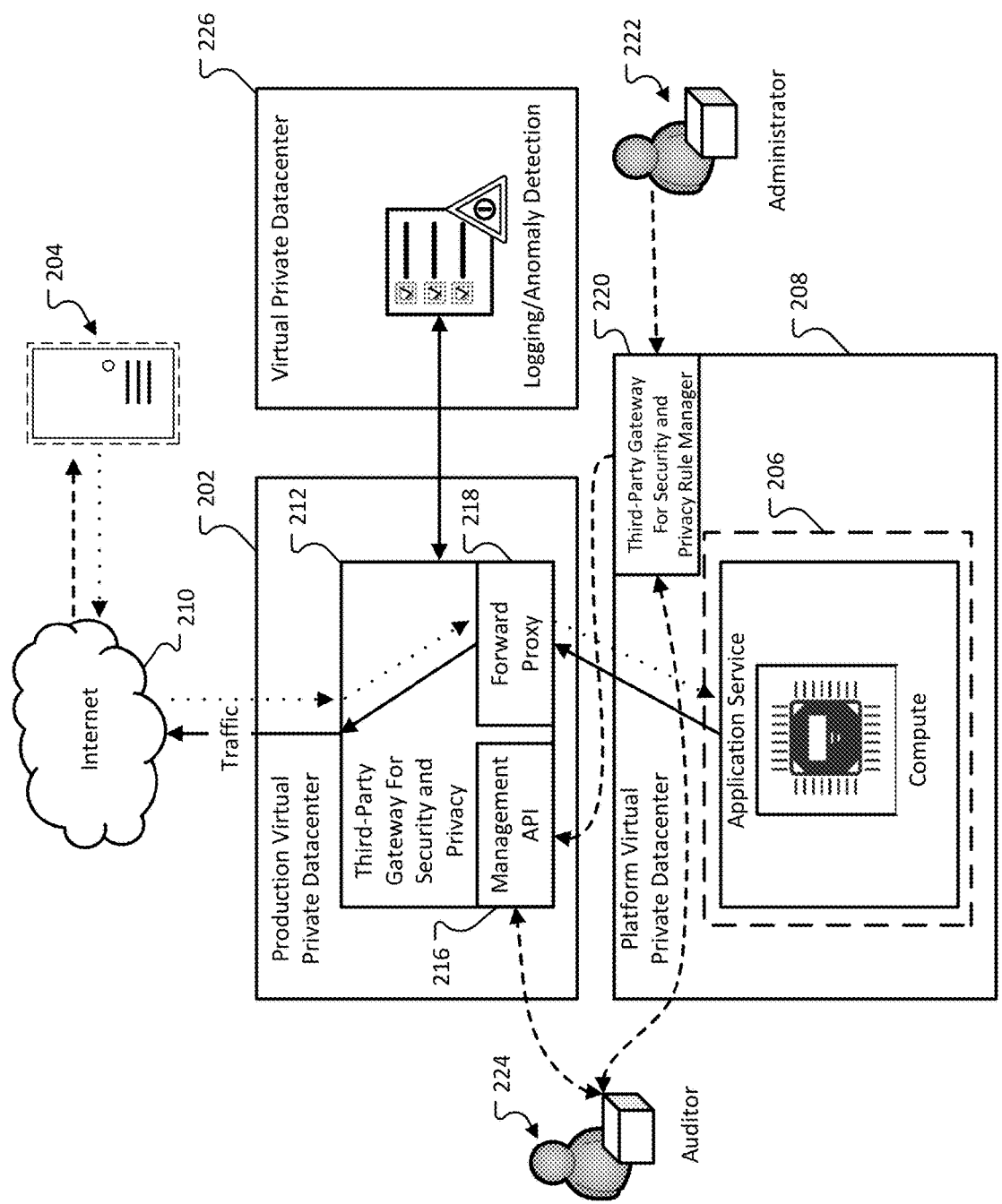
FIG. 2 depicts an example of a generalized solution and framework that provides third-party gateway for servicing requests origination from a microservice and destined for a third-party host in accordance with examples of the present disclosure.

FIG. 2 depicts additional details of an example solution and framework that provides enhanced service quality in accordance with examples of the present disclosure. Similar to FIG. 1, the framework depicted in FIG. 2 monitors, screens, or filters a request directed to a third-party that is received from an application service 206 residing at the platform virtual private datacenter 208. For example, a microservice associated with an application service 206 may initiate a request that is directed to a third-party host, such as the third-party host 204, via the internet 210. Initially, the request may be received at the third-party gateway for security and privacy 212 of the production virtual private datacenter 202. The production virtual private datacenter 202 may utilize the third-party gateway for security and privacy 212 to restrict, screen, and/or limit information flowing out of and the corresponding responses to (e.g., into) the platform virtual private datacenter 208. In examples, the platform virtual private datacenter 208 may be a technology provider and may be approved by one or more organizations, government entities, or the like. Alternatively, or in addition, the platform virtual private datacenter 208 may be designated as complying with one or more data privacy and/or user privacy regulations or security levels as evidenced by a certification of such compliance. For example, the platform virtual private datacenter 208 may be audited on a regular or otherwise periodic basis to achieve and/or maintain such designation. If the host 204 responds to the request originating from the microservice of the application service 206 and then the third-party gateway for security and privacy 212, the response form the host 204 may be routed back to the platform virtual private datacenter 208 via the production virtual private datacenter 202 and then to the microservice operating at the platform virtual private datacenter 208.

The third-party gateway for security and privacy 212 may include a forward proxy server 218 and a management application programing interface (API) 216. The forward proxy server 218 may be comprised of a scalable plurality of forward proxy servers configured to filter, or screen, information flowing from the request provided by the microservice and directed to the host, such as host 204. For example, a forward proxy server 218 may scale up or scale down depending on an amount of traffic originating from the platform virtual private datacenter 208, the application service 206, and/or a microservice. Moreover, one or more administrators 222 may initiate a configuration change by interfacing with the third-party gateway for security and privacy rule manager 220, where the third-party gateway for security and privacy rule manager 220 may cause a new configuration, rule, or policy to be utilized by the management API 216 and one or more of the forward proxy servers comprising the forward proxy server 218.

As further depicted in FIG. 2, an auditor 224 may have access to logs, configuration files, and/or policy related information concerning the implementation of the third-party gateway for security and privacy 212. For example, the auditor 224 may view logged traffic information, previously logged and/or in real-time) provided by each of the forward proxy servers comprising the forward proxy server 218. As another example, the auditor 224 may have access to view logs related to change requests performed at the third-party gateway for security and privacy rule manager 220 as well as other information that may be available via logging and/or anomaly detection processing occurring at or otherwise stored at a virtual private datacenter 226. In examples, the forward proxy server 218 may perform aspects of anomaly detection and store such results at the virtual private datacenter 226.

Figure 3:
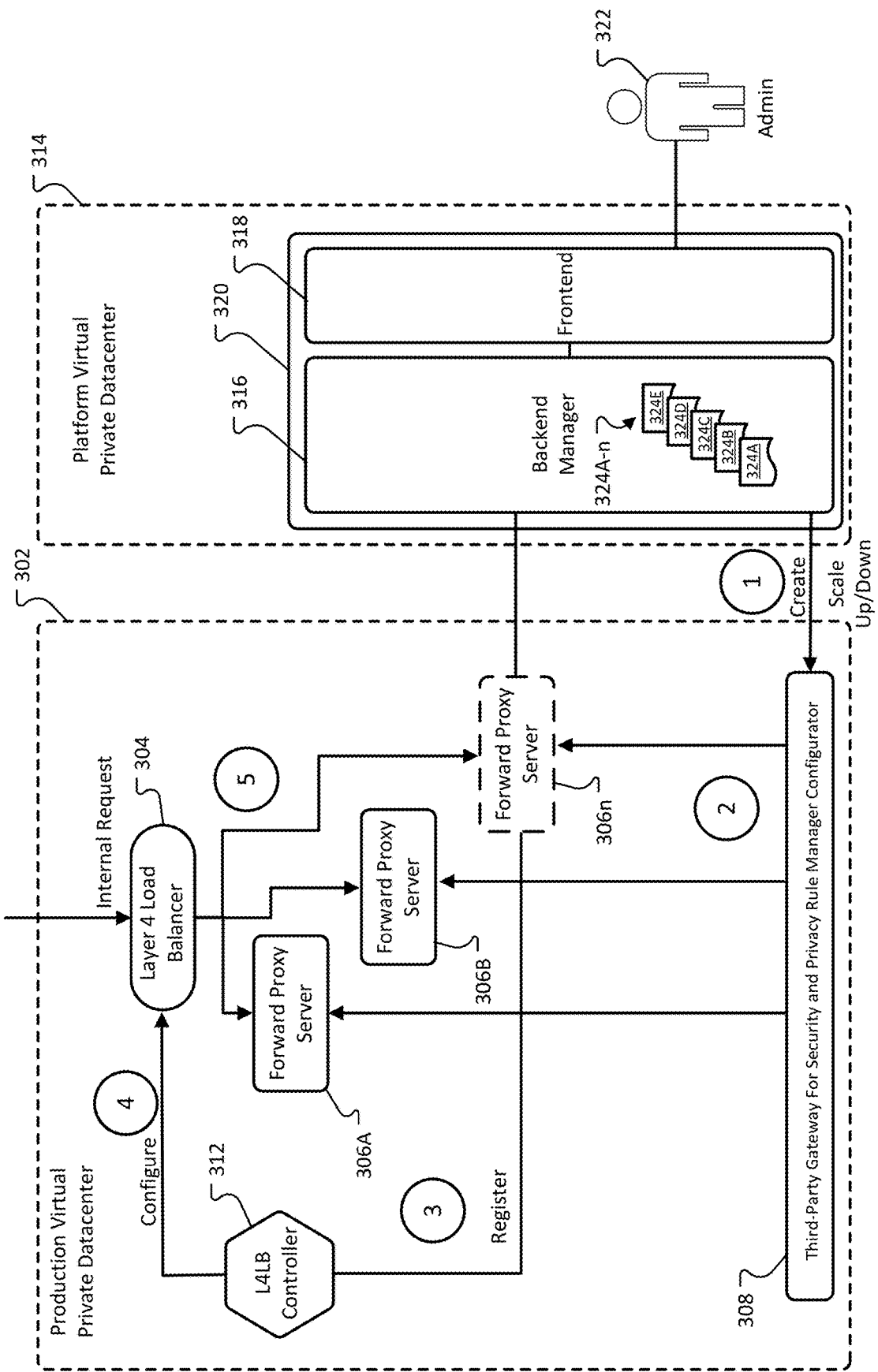
FIG. 3 depicts additional details of the third-party gateway in accordance with examples of the present disclosure.

FIG. 3 depicts additional details of the forward proxy server 218 of FIG. 2 together with a change management/scaling example in accordance with examples of the present disclosure. More specifically, the production virtual private datacenter 302, which may be the same as or similar to the production virtual private datacenter 202 of FIG. 2, may receive an internal request directed to a specific third-party host. The internal request may be directed to a specific third-party host and may be routed to a layer four load balancer 304. Thus, the third-party gateway for security and privacy may include a layer four load balancer as previously described. The layer four load balancer may include one or more components to perform layer seven load balancing. For example, traffic received at the layer four load balancer 304 may be directed to one or more forward proxy servers 306A-306n. In examples, the forward proxy servers 306A-n may be implemented in hardware and/or software and an amount, or number of forward proxy servers 306A-n may be increased or decreased with little to no notice. Each forward proxy server 306A-n performs traffic processing at the application (e.g., layer seven) level. Although each forward proxy server 306A-n includes the same reference character (e.g., 306), each forward proxy server 306A-n may be configured to perform processing specific to one or more requirements of the forward proxy server 306A-n. The number of forward proxy servers 306A-n may be controlled by the third-party gateway for security and privacy rule manager configurator 308.

In examples, an administrator 322 may interact with a frontend 318 of the third-party gateway for security and privacy rule manager 320 to provide one or more commands to a backed manager 316, where the third-party gateway for security and privacy rule manager 320 may be located in a platform virtual private datacenter 314, where the platform virtual private datacenter 314 may be the same as or similar to the platform virtual private datacenter 208 (FIG. 2) as previously described. Based on one or more parameters, such as but not limited to an amount of traffic received from one or more microservices associated with an application service 206 (FIG. 2), a request to initiate the creation of one or more forward proxy servers 306A-n may be received at the third-party gateway for security and privacy rule manager configurator 308. In examples, a new forward proxy server may be installed; in other examples, a new forward proxy server may be spun-up or otherwise initiated for receiving internal requests as routed by the layer four load balancer 304. Once the new (e.g., created, initiated, spun-up, etc.) forward proxy server is added or created, the new forward proxy server may pull a forwarding configuration file 324A from the backend manager 316. The forwarding configuration file 324A may include information indicating a microservice, port, URL, and source and/or destination IP addresses, and whether such microservice, source, destination, and/or URL is whitelisted or otherwise approved for communication. One or more forwarding configuration files 324A-n may be specific to a forward proxy server (e.g., 306A); alternatively, one or more forward proxy servers (e.g., 306A and 306B) may be configured with the same forwarding configuration files (e.g., 324A and 324B) or different forwarding configuration files (e.g., 324A, 324B and 324A, 324C, and/or 324D, 324E).

Once created, the layer four load balancer controller 312 may register the newly created forward proxy server with the layer four load balancer 304 such that the layer four load balancer 304 may include the new forward proxy server as a resource to route traffic to. For example, the layer four load balancer controller 312 may provide information about the traffic that the newly created forward proxy server may handle, process, or otherwise forward to the layer four load balancer 304. Such information (e.g., parameters) may include, but is not limited to, protocol, domain, origin, destination, microservice, and/or whether such parameter is whitelisted). Accordingly, the layer four load balancer 304 may receive traffic associated with an internal service, and determine or otherwise identify a forward proxy server to route such traffic to based on the registration information. Alternatively, or in addition, the layer four load balancer 304 may receive traffic associated with an internal service, and determine or otherwise identify a forward proxy server to route such traffic to randomly or based on a current processing load of a forward proxy server. In examples where the selected forward proxy server does not handle, process, or otherwise forward such traffic, the selected proxy server may identify another proxy server and send such traffic to the subsequently identified proxy server. In some examples, each forward proxy server may be configured to poll or pull the backend manager 316 on a periodic basis to determine if a new configuration file is available from a configuration file repository. When a new configuration file is available, each of the forward proxy servers 306A-n may perform an update at a time that is different from at least one of the other forward proxy servers 306A-n, thereby ensuring a certain processing throughput is available during a time when one or more forward proxy servers 306A-n are updated. In addition, when traffic decreases to the point where not as many forward proxy servers are needed at one time, one or more forward proxy servers maybe suspended or otherwise discarded.

Figure 4:
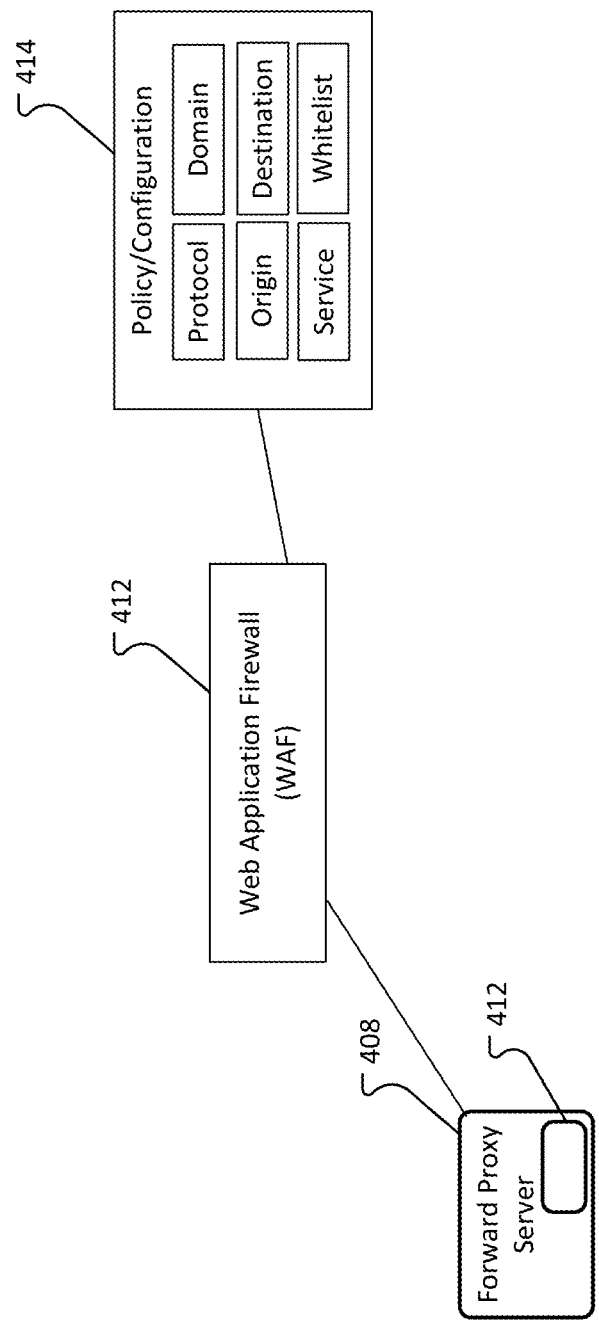
FIG. 4 depicts additional details of a web application firewall (WAF) in accordance with examples of the present disclosure.

FIG. 4 depicts additional details of a forward proxy server 408 in accordance with examples of the present disclosure.

Each forward proxy server 408 may be the same as or similar to the forward proxy server 306 as previously described. Each forward proxy server 408 may include a web application firewall 412 configured to filter incoming requests (e.g., originating from a microservice) for outgoing data (e.g., data sent to a third-party host). For example, the web application firewall 412 may include policy/configuration information indicating a protocol to process, a domain to process, an origin to process, a destination to process, a microservice to process, and/or whether any of the information is whitelisted. In examples, if an incoming request does not match the protocol, domain, origin, destination, a microservice to process, and/or whether any of the information is whitelisted, the WAF 412 may cause the request to be logged and then dropped. Alternatively, or in addition, if an incoming request does not match the protocol, domain, origin, destination, a microservice, and/or whether such parameters are whitelisted, the WAF 412 may cause the request to be routed to another forward proxy server 408 based on one or more of the protocol, domain, origin, destination, microservice, and/or whitelisted information. That is, one or more forward proxy servers 408 may handle traffic specific to a protocol, domain, origin, destination, a microservice, and/or whether such parameters are whitelisted, and combinations thereof.

Figure 5:
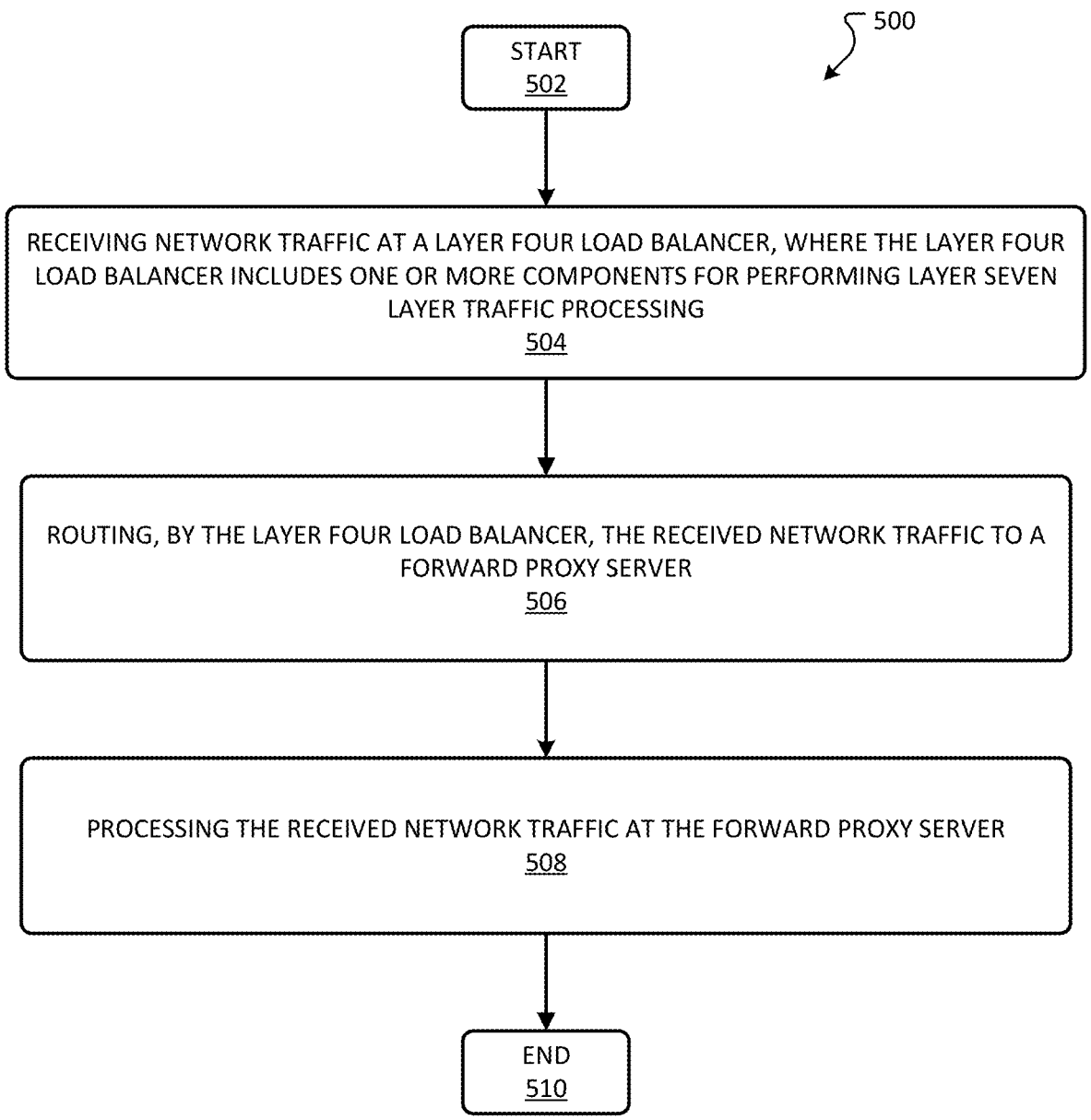
FIG. 5 depicts a simplified method for routing traffic at a load balancer is described in accordance with examples of the present disclosure.

Referring now to FIG. 5, a simplified method for routing traffic at a load balancer is described in accordance with examples of the present disclosure. A general order for the steps of a method 500 is shown in FIG. 5. Generally, the method 500 starts at 502 and ends at 510. The method 500 may include more or fewer steps or may arrange the order of the steps differently than those shown in FIG. 5. The method 500 can be executed as a set of computer-executable instructions executed by a computer system and encoded or stored on a computer readable medium. In an illustrative aspect, the method 500 is executed by a computing device associated with a third-party gateway for security and privacy (e.g., 212). However, it should be appreciated that aspects of the method 500 may be performed by one or more processing devices, such as a computer, server, or other hardware element. Further, the method 500 can be performed by gates or circuits associated with a processor, Application Specific Integrated Circuit (ASIC), a field programmable gate array (FPGA), a system on chip (SOC), a neural processing unit, or other hardware device. Hereinafter, the method 500 shall be explained with reference to the systems, components, modules, software, data structures, user interfaces, etc. described in conjunction with FIGS. 1-4.

The method 500 starts at 502, where flow may proceed to 504. At 504, an application service and/or a microservice associated with an application service (e.g., 206) may initiate a request that is directed to a third-party host (e.g., 204) via the internet (e.g., 210). Initially, the request may be received at the third-party gateway for security and privacy (e.g., 212) of a production virtual private datacenter (e.g., 202). The production virtual private datacenter may utilize the third-party gateway for security and privacy to restrict, screen, and/or limit information flowing out of and the corresponding responses to (e.g., into) a platform virtual private datacenter (e.g., 208). In examples, the platform virtual datacenter may be a technology provider and may be approved by one or more organizations, government entities, or the like. Alternatively, or in addition, the platform virtual private datacenter may be designated as complying with one or more data privacy and/or user privacy regulations or security levels as evidenced by a certification of such compliance. For example, the platform virtual private datacenter may be audited on a regular or otherwise periodic basis to achieve and/or maintain such designation.

The third-party gateway for security and privacy may include a forward proxy (e.g., 218). The forward proxy may be comprised of a scalable plurality of forward proxy servers configured to filter, or screen, information flowing from the request provided by the microservice and directed to the host. More specifically, the production virtual private datacenter may receive an internal request directed to a specific third-party host. The internal request may be directed to a specific third-party host and may be routed to a layer four load balancer (e.g., 304). Thus, the third-party gateway for security and privacy may include a layer four load balancer as previously described. The layer four load balancer may include one or more components to perform traffic processing at the application (e.g., layer seven) level.

At 506, traffic received at the layer four load balancer may be directed to one or more forward proxy servers (e.g., 306A-306n). In examples, the forward proxy servers may be implemented in hardware and/or software and an amount, or number of forward proxy servers may be increased or decreased with little to no notice. Thus, at 508, each forward proxy server performs traffic processing at the application (e.g., layer seven) level. Each forward proxy server may be configured to perform processing specific to one or more requirements of the forward proxy server. In examples, the method 500 may end at 510.

Figure 6:
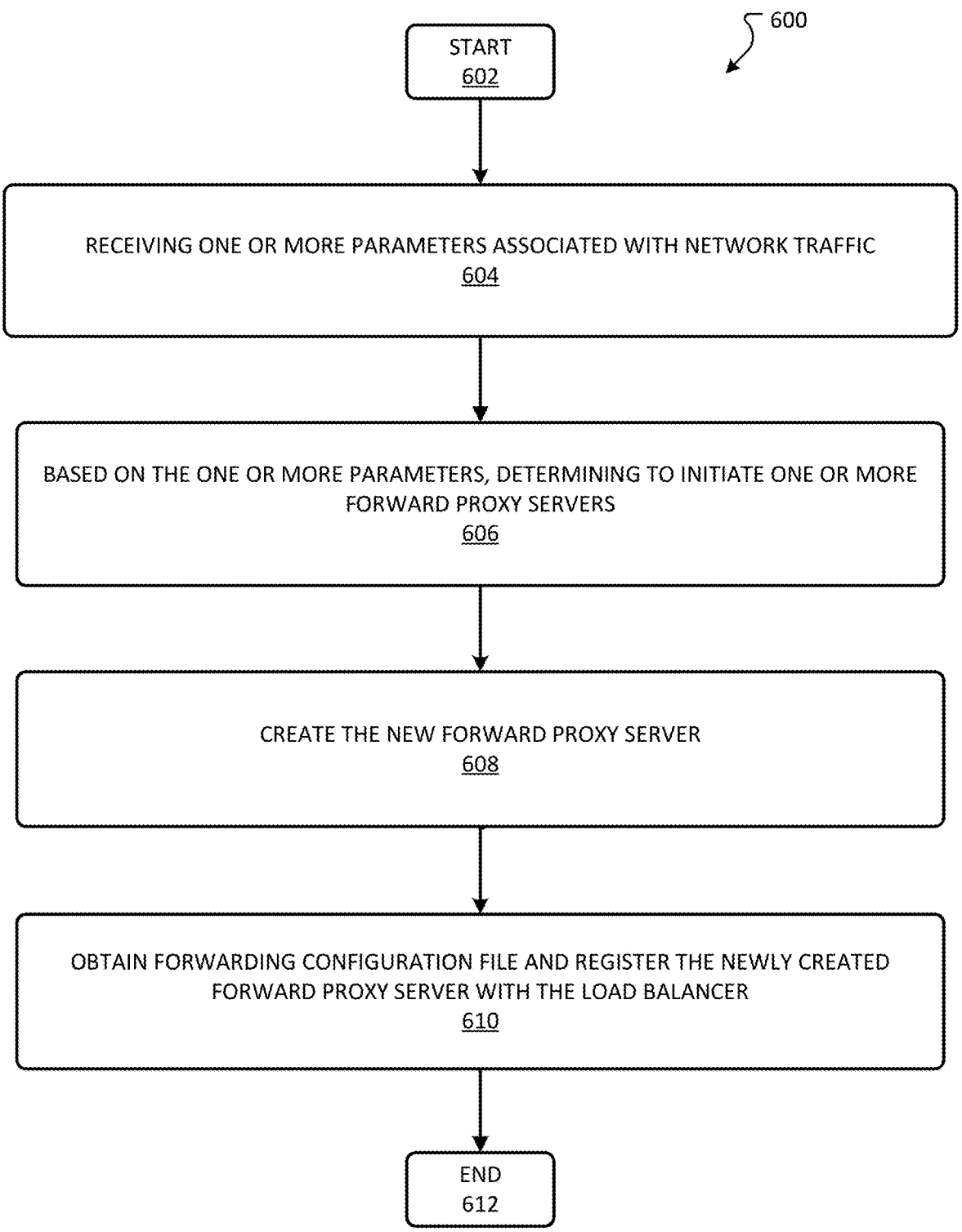
FIG. 6 depicts a simplified method for scaling a network processing ability of a third-party gateway for security and privacy in accordance with examples of the present disclosure.

Referring now to FIG. 6, a simplified method for scaling a network processing ability of the third-party gateway for security and privacy is described in accordance with examples of the present disclosure. A general order for the steps of a method 600 is shown in FIG. 6. Generally, the method 600 starts at 602 and ends at 610. The method 600 may include more or fewer steps or may arrange the order of the steps differently than those shown in FIG. 6. The method 600 can be executed as a set of computer-executable instructions executed by a computer system and encoded or stored on a computer readable medium. In an illustrative aspect, the method 600 is executed by a computing device associated with a third-party gateway for security and privacy (e.g., 212). However, it should be appreciated that aspects of the method 600 may be performed by one or more processing devices, such as a computer, server, or other hardware element. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-5.

The method 600 starts at 602, where flow may proceed to 604. At 604, one or more parameters, such as but not limited to an amount of traffic received from one or more microservices associated with an application service 206 (FIG. 2), may be received. At 606, based on the one or more parameters, such as but not limited to an amount of traffic received from one or more microservices associated with an application service 206 (FIG. 2), a determination to initiate the creation of one or more forward proxy servers 306A-n may be made, for example, at the third-party gateway for security and privacy rule manager configurator (e.g., 308).

At 608, based on the determination, a new forward proxy server may be initiated (e.g., installed, spun-up, or otherwise created for receiving internal requests as routed by the layer four load balancer. At 610, once the new (e.g., created, initiated, spun-up, etc.) forward proxy server is added or created, the new forward proxy server may pull a forwarding configuration file (e.g., 324A) from the backend manager (e.g., 316). The forwarding configuration file may include information indicating a microservice, port, URL, and source and/or destination IP addresses, and whether such microservice, source, destination, and/or URL is whitelisted or otherwise approved for communication. One or more forwarding configuration files may be specific to a forward proxy server, where one or more forward proxy servers may be configured with the same forwarding configuration files or different forwarding configuration files.

Once created, a layer four load balancer controller (e.g., 312) may register the newly created forward proxy server with the layer four load balancer such that the layer four load balancer may include the new forward proxy server as a resource to route traffic to. For example, the layer four load balancer controller may provide information about the traffic that the newly created forward proxy server may handle, process, or otherwise forward to the layer four load balancer. Such information (e.g., parameters) may include, but is not limited to, protocol, domain, origin, destination, microservice, and/or whether such parameter is whitelisted). Accordingly, the layer four load balancer may receive traffic associated with an internal service, and determine or otherwise identify a forward proxy server to route such traffic to based on the registration information. Alternatively, or in addition, the layer four load balancer may receive traffic associated with an internal service, and determine or otherwise identify a forward proxy server to route such traffic to randomly or based on a current processing load of a forward proxy server. In examples where the selected forward proxy server does not handle, process, or otherwise forward such traffic, the selected proxy server may identify another proxy server and send such traffic to the subsequently identified proxy server. Method 600 may end at 612.

In some examples, each forward proxy server may be configured to poll or pull the backend manager on a periodic basis to determine if a new configuration file is available from a configuration file repository. When a new configuration file is available, each of the forward proxy servers may perform an update at a time that is different from at least one of the other forward proxy servers, thereby ensuring a certain processing throughput is available during a time when one or more forward proxy servers are updated. In addition, when traffic decreases to the point where not as many forward proxy servers are needed at one time, one or more forward proxy servers maybe suspended or otherwise discarded.

Figure 7:
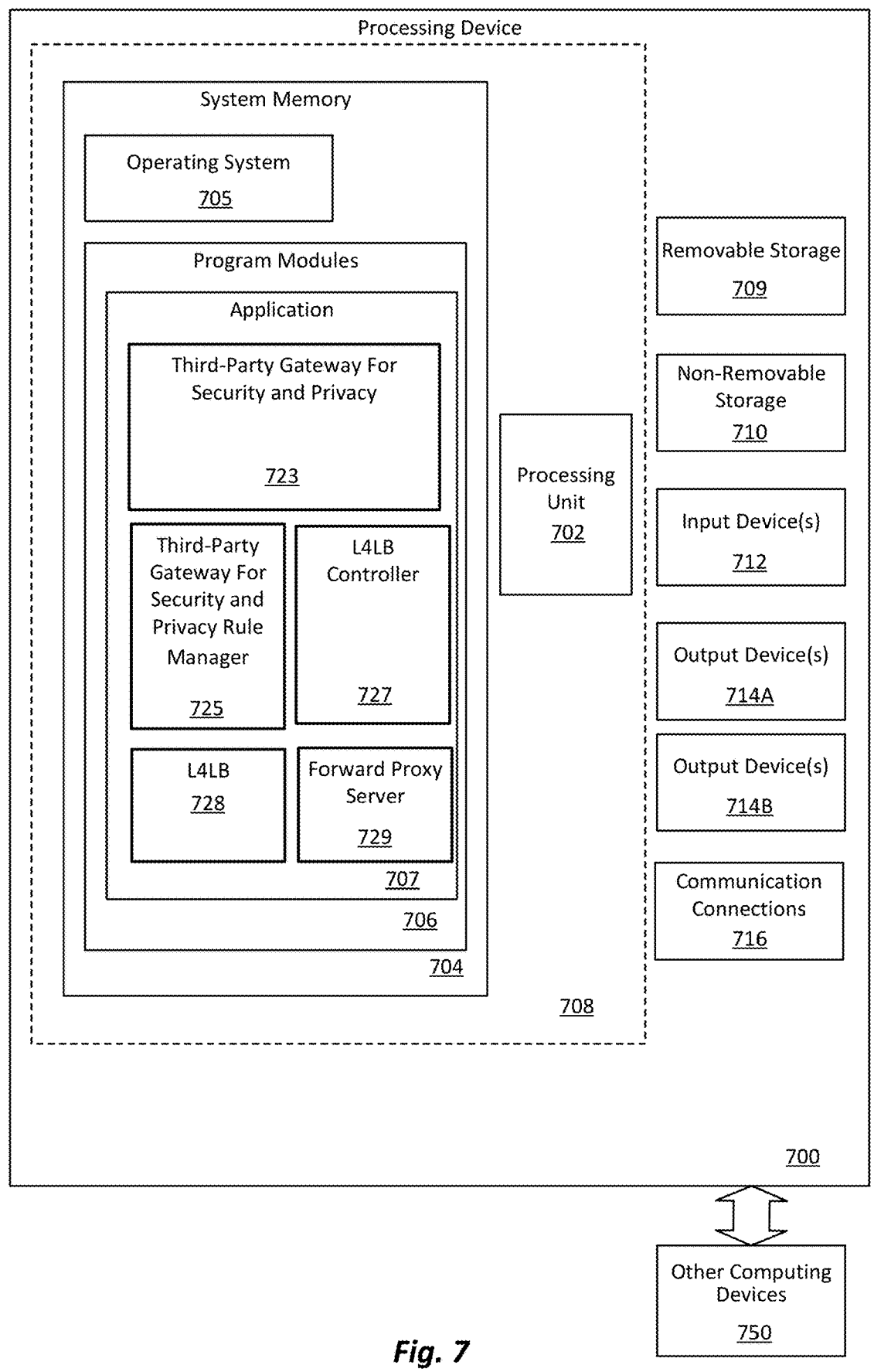
FIG. 7 depicts a block diagram illustrating physical components (e.g., hardware) of a computing device with which aspects of the disclosure may be practiced.

FIG. 7 is a block diagram illustrating physical components (e.g., hardware) of a processing device 700 with which aspects of the disclosure may be practiced. For example, the processing device 700 may represent one or more components as depicted in FIGS. 1-4. In a basic configuration, the processing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for performing the various aspects disclosed herein such. The operating system 705, for example, may be suitable for controlling the operation of the processing device 700. Furthermore, aspects of the disclosure may be practiced in conjunction with other operating systems, or any other application program and is not limited to any particular application or system. This basic configuration is illustrated in FIG. 7 by those components within a dashed line 708. The processing device 700 may have additional features or functionality. For example, the processing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, several program modules and data files may be stored in the system memory 704. While executing on the at least one processing unit 702, the application 707 or the program modules 706 may perform processes including, but not limited to, one or more aspects, as described herein. The application 720 includes a layer 4 load balancer 728, a forward proxy server 729, a layer four load balancer controller 727, a third-party gateway for security and privacy rule manager 725, and a third-party gateway for security and privacy 723, as described in more detail with regard to FIGS. 1-6. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the processing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The processing device 700 may also have one or more input device(s) 712 such as a keyboard, a mouse, a pen, a sound or voice input device, a touch or swipe input device, etc. The output device(s) 714A such as a display, speakers, a printer, etc. may also be included. An output 714B, corresponding to a virtual display may also be included. The aforementioned devices are examples and others may be used. The processing device 700 may include one or more communication connections 716 allowing communications with other computing or processing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the processing device 700. Any such computer storage media may be part of the processing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to a third-party gateway for security and privacy according to at least the examples provided in the sections below:

(A1) In one aspect, some examples include a third-party gateway for security and privacy. The third-party gateway for security and privacy may include: a layer four load balancer; a plurality of forward proxy servers; and a management backend configured to provide a configuration implementation to the plurality of forward proxy servers, the configuration implementation specifying one or more processing parameters for each of the forward proxy servers, wherein each forward proxy server of the plurality of forward proxy servers is configured to perform layer seven network traffic processing on network traffic received from the layer four load balancer in accordance with the one or more processing parameters, the network traffic being directed to a third-party host residing external to a virtual private datacenter in which the third-party gateway for security and privacy resides.

(A2) In some examples of A1, the layer four load balancer is configured to receive network traffic from a service within the virtual private datacenter, determine at least one forward proxy server to send a portion of the received network traffic for further processing, and route the portion of the received network traffic to the determined at least one forward proxy server.

(A3) In some examples of A1-A2, the determined at least one forward proxy server routes the portion of the received network traffic to another different forward proxy server when the portion of the received network traffic does not match at least one of a protocol, domain, origin, destination, or microservice that is specific to the determined at least one forward proxy server.

(A4) In some examples of A1-A3, the plurality of forward proxy servers are configured to interrogate a configuration rules repository and determine if a new configuration implementation is available, wherein when a new configuration implementation is available, each of the forward proxy servers of the plurality of forward proxy servers is configured to perform an update to the new configuration implementation at a time that is different from at least one other forward proxy server of the plurality of forward proxy servers.

(A5) In some examples of A1-A4, the forward proxy server of the plurality of forward proxy servers logs the request and prohibits the request from leaving the virtual private datacenter when a host or service associated with a request that is received from within the virtual private datacenter does not match a corresponding host or service processing parameter in the configuration implementation of a forward proxy server of the plurality of forward proxy servers.

(A6) In some examples of A1-A5, the third-party gateway for security and privacy is configured to create a new forward proxy server in response to a received request; provide a configuration implementation to the newly created forward proxy server; register the newly created forward proxy server with the layer four load balancer; and provide network traffic to the newly created forward proxy server.

(A7) In some examples of A1-A6, the third-party gateway for security and privacy is configured to receive an egress rule update at a traffic egress rule monitor, wherein the egress rule update is associated with a service that is within the virtual private datacenter cause at least one forward proxy server of the plurality of proxy servers to receive a new configuration implementation; and process network traffic received from the service in accordance with the new configuration implementation.

(A8) In some examples of A1-A7, the third-party gateway for security and privacy is included in a system for providing enhanced security at a virtual private datacenter. The system may include the virtual private datacenter including the third-party gateway for security and privacy; and a technology partner datacenter including application services configured to provide a request to the third-party gateway for security and privacy, the request being directed to the third-party host residing external to the virtual private datacenter.

(B1) In one aspect, some examples include a method of providing enhanced security at a virtual private datacenter using a third-party gateway for security and privacy. The method may include receiving network traffic at a layer four load balancer of the third-party gateway for security and privacy, wherein the network traffic is directed to a third-party host residing external to the virtual private datacenter in which the third-party gateway for security and privacy resides, and wherein the network traffic is received from a service within the virtual private datacenter; and routing, by the layer four load balancer, the received network traffic to a forward proxy server of a plurality of forward proxy servers; and performing, by the forward proxy server of a plurality of forward proxy servers, layer seven network traffic processing on the received network traffic in accordance with one or more processing parameters included in a configuration implementation.

(B2) In some examples of B1, the method further includes selecting, by the layer four load balancer, the forward proxy server of the plurality of forward proxy servers to send the received network traffic for further processing based on configuration information associated with one or more processing parameters included in the configuration implementation.

(B3) In some examples of B1-B2, the method further includes routing, by the layer four load balancer, other received network traffic to a second forward proxy server of the plurality of forward proxy servers; determining, by the second forward proxy server, that the other received network traffic does not match at least one of a protocol, domain, origin, destination, or microservice that is specific to the second forward proxy server; and routing, by the second forward proxy server, the other received network traffic to another different forward proxy server.

(B4) In some examples of B1-B3, the method further includes interrogating, by the plurality of forward proxy servers, a configuration rules repository; determining if a new configuration implementation is available; and when a new configuration implementation is available, performing an update, by each forward proxy server of the plurality of forward proxy servers, to the new configuration implementation at a time that is different from at least one other forward proxy server of the plurality of forward proxy servers.

(B5) In some examples of B1-B4, the method further includes creating a new forward proxy server in response to a received request; providing a configuration implementation to the newly created forward proxy server; registering the newly created forward proxy server with the layer four load balancer; and providing network traffic to the newly created forward proxy server.

(B6) In some examples of B1-B5, the method further includes receiving an egress rule update at a traffic egress rule monitor, wherein the egress rule update is associated with a service that is within the virtual private datacenter; causing at least one forward proxy server of the plurality of proxy servers to receive a new configuration implementation; and processing network traffic received from the service in accordance with the new configuration implementation.

(B7) In some examples of B1-B6, the method further includes determining that a request received from within the virtual private datacenter does not match a corresponding host or service processing parameter in the configuration implementation of the forward proxy server of the plurality of forward proxy servers; and logging the request and prohibiting the request from leaving the virtual private datacenter.

In yet another aspect, some examples include a non-transitory computer-readable storage medium storing one or more programs for execution by one or more processors of a storage device, the one or more programs including instructions for performing any of the methods described herein (e.g., B1-B7 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart or process. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computing system for a third-party gateway for security and privacy comprising:
    at least one processing unit; and
    a memory storing instructions that are executed by the at least one processing unit to perform the method comprising:
    providing a layer four load balancer that performs traffic processing at a layer seven level;
    providing a plurality of forward proxy servers;
    providing a management backend that provides a configuration implementation to the plurality of forward proxy servers, the configuration implementation specifying one or more processing parameters for each of the forward proxy servers, wherein each forward proxy server of the plurality of forward proxy servers performs layer seven network traffic processing on network traffic received from the layer four load balancer in accordance with the one or more processing parameters, the network traffic being directed to a third-party host residing external to a virtual private datacenter in which the computing system for the third-party gateway for security and privacy resides;
    creating a new forward proxy server in response to an amount of traffic received from one or more microservices associated with an application service;

providing a configuration implementation to the newly created forward proxy server;
registering the newly created forward proxy server with the layer four load balancer; and
suspend or discard the newly created forward proxy server when the amount of traffic received from the one or more microservices associated with the application service decreases.

2. The computing system for the third-party gateway for security and privacy of claim 1, wherein the layer four load balancer receives network traffic from a service within the virtual private datacenter, determines at least one forward proxy server to send a portion of the received network traffic for further processing, and routes the portion of the received network traffic to the determined at least one forward proxy server.

3. The computing system for the third-party gateway for security and privacy of claim 2, wherein when the portion of the received network traffic does not match at least one of a protocol, domain, origin, destination, or microservice that is specific to the determined at least one forward proxy server, the determined at least one forward proxy server routes the portion of the received network traffic to another different forward proxy server.

4. The computing system for the third-party gateway for security and privacy of claim 1, wherein the plurality of forward proxy servers interrogate a configuration rules repository and determine if a new configuration implementation is available, wherein when a new configuration implementation is available, each of the forward proxy servers of the plurality of forward proxy servers performs an update to the new configuration implementation at a time that is different from at least one other forward proxy server of the plurality of forward proxy servers.

5. The computing system for the third-party gateway for security and privacy of claim 1, wherein when a host or service associated with a request that is received from within the virtual private datacenter does not match a corresponding host or service processing parameter in the configuration implementation of a forward proxy server of the plurality of forward proxy servers, the forward proxy server of the plurality of forward proxy servers logs the request and prohibits the request from leaving the virtual private datacenter.

6. The computing system for the third-party gateway for security and privacy of claim 1, wherein
the memory storing instructions that are executed by the at least one processing unit to perform the method further comprising:
providing network traffic to the newly created forward proxy server.

7. The computing system for the third-party gateway for security and privacy of claim 1, wherein
the memory storing instructions that are executed by the at least one processing unit to perform the method further comprising:
receiving an egress rule update at a traffic egress rule monitor, wherein the egress rule update is associated with a service that is within the virtual private datacenter;
causing at least one forward proxy server of the plurality of proxy servers to receive a new configuration implementation; and
processing network traffic received from the service in accordance with the new configuration implementation.

8. The computing system for the third-party gateway for security and privacy of claim 1, the computing system further comprising:
a technology partner datacenter including application services server that provides a request to the computing system for the third-party gateway for security and privacy, the request being directed to the third-party host residing external to the virtual private datacenter.

9. A method of providing enhanced security at a virtual private datacenter using a third-party gateway for security and privacy, the method comprising:
receiving network traffic at a layer four load balancer of the third-party gateway for security and privacy, the layer four load balancer performs traffic processing at a layer seven level, wherein the network traffic is directed to a third-party host residing external to the virtual private datacenter in which the third-party gateway for security and privacy resides, and wherein the network traffic is received from a service within the virtual private datacenter;
routing, by the layer four load balancer, the received network traffic to a forward proxy server of a plurality of forward proxy servers;
performing, by the forward proxy server of a plurality of forward proxy servers, layer seven network traffic processing on the received network traffic in accordance with one or more processing parameters included in a configuration implementation;
creating a new forward proxy server in response to an amount of traffic received from one or more microservices associated with an application service;
provide a configuration implementation to the newly created forward proxy server;
register the newly created forward proxy server with the layer four load balancer; and
suspend or discard the newly created forward proxy server when the amount of traffic received from the one or more microservices associated with the application service decreases.

10. The method of claim 9, further comprising:
selecting, by the layer four load balancer, the forward proxy server of the plurality of forward proxy servers to send the received network traffic for further processing based on configuration information associated with one or more processing parameters included in the configuration implementation.

11. The method of claim 9, further comprising:
routing, by the layer four load balancer, other received network traffic to a second forward proxy server of the plurality of forward proxy servers;
determining, by the second forward proxy server, that the other received network traffic does not match at least one of a protocol, domain, origin, destination, or microservice that is specific to the second forward proxy server; and
routing, by the second forward proxy server, the other received network traffic to another different forward proxy server.

12. The method of claim 9, further comprising:
interrogating, by the plurality of forward proxy servers, a configuration rules repository;
determining if a new configuration implementation is available; and
when a new configuration implementation is available, performing an update, by each forward proxy server of the plurality of forward proxy servers, to the new configuration implementation at a time that is different from at least one other forward proxy server of the plurality of forward proxy servers.

13. The method of claim 9, further comprising:
providing network traffic to the newly created forward proxy server.

14. The method of claim 9, further comprising:
receiving an egress rule update at a traffic egress rule monitor, wherein the egress rule update is associated with a service that is within the virtual private datacenter;
causing at least one forward proxy server of the plurality of proxy servers to receive a new configuration implementation; and
processing network traffic received from the service in accordance with the new configuration implementation.

15. The method of claim 9, further comprising:
determining that a request received from within the virtual private datacenter does not match a corresponding host or service processing parameter in the configuration implementation of the forward proxy server of the plurality of forward proxy servers; and
logging the request and prohibiting the request from leaving the virtual private datacenter.

16. A non-transitory computer-readable storage medium including instructions, which when executed by a processor, causes the processor to:
receive network traffic at a layer four load balancer of a third-party gateway for security and privacy, the layer four load balancer performs traffic processing at a layer seven level, wherein the network traffic is directed to a third-party host residing external to a virtual private datacenter in which the third-party gateway for security and privacy resides, and wherein the network traffic is received from a service within the virtual private datacenter;
route, by the layer four load balancer, the received network traffic to a forward proxy server of a plurality of forward proxy servers;
perform, by the forward proxy server of a plurality of forward proxy servers, layer seven network traffic processing on the received network traffic in accordance with one or more processing parameters included in a configuration implementation;
create a new forward proxy server in response to an amount of traffic received from one or more microservices associated with an application service;
provide a configuration implementation to the newly created forward proxy server;
register the newly created forward proxy server with the layer four load balancer; and
suspend or discard the newly created forward proxy server when the amount of traffic received from the one or more microservices associated with the application service decreases.

17. The non-transitory computer-readable storage medium of claim 16, wherein the instructions cause the processor to:
interrogate, by the plurality of forward proxy servers, a configuration rules repository;
determine if a new configuration implementation is available; and
when a new configuration implementation is available, cause each forward proxy server of the plurality of forward proxy servers to perform an update to the new configuration implementation at a time that is different from at least one other forward proxy server of the plurality of forward proxy servers.

18. The non-transitory computer-readable storage medium of claim 17, wherein the instructions cause the processor to:
provide network traffic to the newly created forward proxy server.

19. The non-transitory computer-readable storage medium of claim 16, wherein the instructions cause the processor to:
receive an egress rule update at a traffic egress rule monitor, wherein the egress rule update is associated with a service that is within the virtual private datacenter;
cause at least one forward proxy server of the plurality of proxy servers to receive a new configuration implementation; and
process network traffic received from the service in accordance with the new configuration implementation.

20. The non-transitory computer-readable storage medium of claim 16, wherein the instructions cause the processor to:
determine that a request received from within the virtual private datacenter does not match a corresponding host or service processing parameter in the configuration implementation of the forward proxy server of the plurality of forward proxy servers; and
log the request and prohibit the request from leaving the virtual private datacenter.

\* \* \* \* \*